(12) United States Patent
Meister et al.

(10) Patent No.: US 6,671,718 B1
(45) Date of Patent: Dec. 30, 2003

(54) EMAIL CLIENT APPLICATION INCORPORATING AN ACTIVE TRANSMIT AUTHORIZATION REQUEST

(76) Inventors: Mark Meister, 9113 Wooden Bridge Rd., Potomac, MD (US) 20854; James Randall Beckers, 14600 Crossway Rd., Rockville, MD (US) 20853

( * ) Notice: Subject to any disclaimer, the term of this patent is extended or adjusted under 35 U.S.C. 154(b) by 0 days.

(21) Appl. No.: 09/337,035

(22) Filed: Jun. 28, 1999

(51) Int. Cl.[7] ................................................ G06F 15/16
(52) U.S. Cl. ........................ 709/206; 709/201; 709/203
(58) Field of Search ............................... 709/206, 203, 709/201

(56) References Cited

U.S. PATENT DOCUMENTS

| | | | |
|---|---|---|---|
| 5,125,075 A | | 6/1992 | Goodale et al. |
| 5,555,346 A | | 9/1996 | Gross et al. |
| 5,557,723 A | * | 9/1996 | Holt et al. ................ 345/866 |
| 5,632,018 A | * | 5/1997 | Otorii ...................... 709/200 |
| 5,694,616 A | | 12/1997 | Johnson et al. |
| 5,742,769 A | | 4/1998 | Lee et al. |
| 5,870,548 A | | 2/1999 | Nielsen |
| 5,878,230 A | | 3/1999 | Weber et al. |
| 6,023,723 A | * | 2/2000 | McCormick et al. .......... 707/1 |
| 6,047,310 A | * | 4/2000 | Kamakura et al. .......... 709/201 |
| 6,067,101 A | * | 5/2000 | Arakawa et al. ............. 347/19 |
| 6,073,133 A | * | 6/2000 | Chrabaszcz ................. 707/10 |
| 6,073,165 A | * | 6/2000 | Narasimhan et al. ....... 709/206 |
| 6,112,227 A | * | 8/2000 | Heiner ...................... 709/202 |
| 6,185,603 B1 | * | 2/2001 | Henderson et al. ......... 709/206 |
| 6,192,407 B1 | * | 2/2001 | Smith et al. ................ 709/200 |
| 6,212,551 B1 | * | 4/2001 | Asghar et al. .............. 709/206 |
| 6,230,156 B1 | * | 5/2001 | Hussey ........................ 705/1 |
| 6,230,186 B1 | * | 5/2001 | Yaker ........................ 709/206 |
| 6,249,808 B1 | * | 6/2001 | Seshadri ..................... 709/203 |
| 6,266,692 B1 | * | 7/2001 | Greenstein ................. 709/206 |
| 6,330,590 B1 | * | 12/2001 | Cotten ........................ 709/206 |
| 6,332,164 B1 | * | 12/2001 | Jain ........................... 709/203 |
| 6,334,142 B1 | * | 12/2001 | Newton et al. .............. 709/203 |
| 6,360,221 B1 | * | 3/2002 | Gough et al. .................. 705/14 |
| 6,405,225 B1 | * | 6/2002 | Apfel et al. ................. 707/500 |
| 6,427,164 B1 | * | 7/2002 | Reilly ........................ 709/206 |
| 6,434,601 B1 | * | 8/2002 | Rollins ...................... 709/206 |
| 6,460,074 B1 | * | 10/2002 | Fishkin ...................... 709/206 |

OTHER PUBLICATIONS

"Advanced Mail List Verify", E-Mail Management Software, Nov. 12, 1999, 1 pg.
"Advanced Direct Remailer", E-Mail Management Software, Nov. 12, 1999, 1 pg.

* cited by examiner

Primary Examiner—Krisna Lim
(74) Attorney, Agent, or Firm—Staas & Halsey LLP

(57) ABSTRACT

A system that monitors for an initiation of the sending of an electronic message. The user is alerted or warned that the message is about to be sent. The alert includes a list of the addressees of the message. The list includes addressee aliases where available. The sender can then verify that the addressees are correct and change or delete those on the list, or erase the message. The system also provides such an alert when a computer initiates the sending of an unauthorized message and allows the user to delete the unauthorized message.

25 Claims, 6 Drawing Sheets

62 —

From: bill@company.com
To: george@company.com
Cc: susan@company.com, benefits, payroll, marketing@competition.com
Subject: merger meeting

64 —

George-

Our meeting has been postponed until 1 PM.

Bill

Figure 3

EMAIL CLIENT APPLICATION INCORPORATING AN ACTIVE TRANSMIT AUTHORIZATION REQUEST

BACKGROUND OF THE INVENTION

1. Field of the Invention

The present invention is directed to a system that alerts or warns a user of an electronic mail system as to the addressees of a message before the message is sent, after the user indicates that the message is to be sent, and allows the sender to revise the list of addressees or cancel the sending entirely.

2. Description of the Related Art

A person who receives electronic mail (e-mail) often receives a message as one of many recipients. When the individual or e-mail system user responds or replies to the message, often the user may select an option that replies to the sender and sends copies of the reply to all of the recipients of the original message. This selection is often made before the user has composed the reply. It can be the case that the user replies with comments about one of the recipients, not consciously intending that a copy be sent to that particular recipient. Once the user has finished the message the user initiates sending the message to all of the addresses at once, including sending the message to the unintended addressee. This often causes discord between the user and the unintended recipient who erroneously received the message.

A similar situation can occur when addressees of a message are being selected from an address book or list. The user, when selecting the recipients, may inadvertently select ("click-on") an addressee next to the intended recipient in the list creating a situation where a message is erroneously addressed.

Sending a message to multiple recipients using a single mailing list name is another example of how e-mail might be mistakenly directed. For example, a sender wants to e-mail a group and is thinking about the regular members as the message is written. The sender forgets that a substitute member is also on the list, or the list may be out of the sender's control and unknown to the sender the list has been modified to include an additional member, and the sender writes something about the individual or substitute member and sends the message.

In addressing an e-mail, a user often refers to a recipient by a nickname or alias. When two or more aliases are similar, for example when potential addressees (i.e., address book entries) have the same last name, the user may inadvertently address an e-mail to the similar addressee.

What is needed is a system that will alert the user to addressees of a message after it has been composed but before it is sent that will allow the user to change the list of addressees or to edit the message considering the list of addressees.

Often e-mail is improperly addressed because of the haste with which a sender formulates an address. Ultimately, such mail will be returned after some period of time. The impact of this mistake is hardest felt when time is of the essence.

What is needed is a system that will recognize or detect and alert the user to incomplete or improper addresses before a message is sent and allow the user to correct the addresses.

Today computer viruses can compose and send e-mail without a user being aware of the transmission of such unauthorized e-mail.

What is needed is a system that will alert a user when an unauthorized e-mail is being sent by the user's system and allow the user to cancel the message before it is sent.

SUMMARY OF THE INVENTION

It is an object of the present invention to provide an e-mail system that alerts a user to the addressees of an e-mail message before it is sent.

It is another object of the present invention to allow a user to modify a list of addressees of an e-mail message before the message is sent and after the addressee list is originally created.

It is also an object of the present invention to alert a user when an unauthorized e-mail message is being sent.

It is a further object of the present invention to determine whether an addressee's address is properly entered and to alert the user in the case of a potentially undeliverable message prior to sending.

The above objects can be attained by a system that alerts the sender with a list of the addressees of an e-mail message before the message is sent. The sender can then verify that the addressees are correct or change or delete those on the list. The system also provides such an alert prior to sending an unauthorized message and allows the user to delete the unauthorized message.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 illustrates the structure of a typical e-mail message.

DESCRIPTION OF THE PREFERRED EMBODIMENTS

The present invention is directed to a system that includes an electronic mail (e-mail) alert system which reduces the possibility of inadvertently sending an e-mail message to an unintended recipient and allows the user to intercept and stop unauthorized e-mail from being sent by the user's computer. The present invention modifies the operation of a conventional e-mail system (or computer-user to computer user or other network communication device to computer-user messaging system or other network communication device) to alert the user before messages are sent and allows the user to change the recipients or cancel the message.

Figure 1:
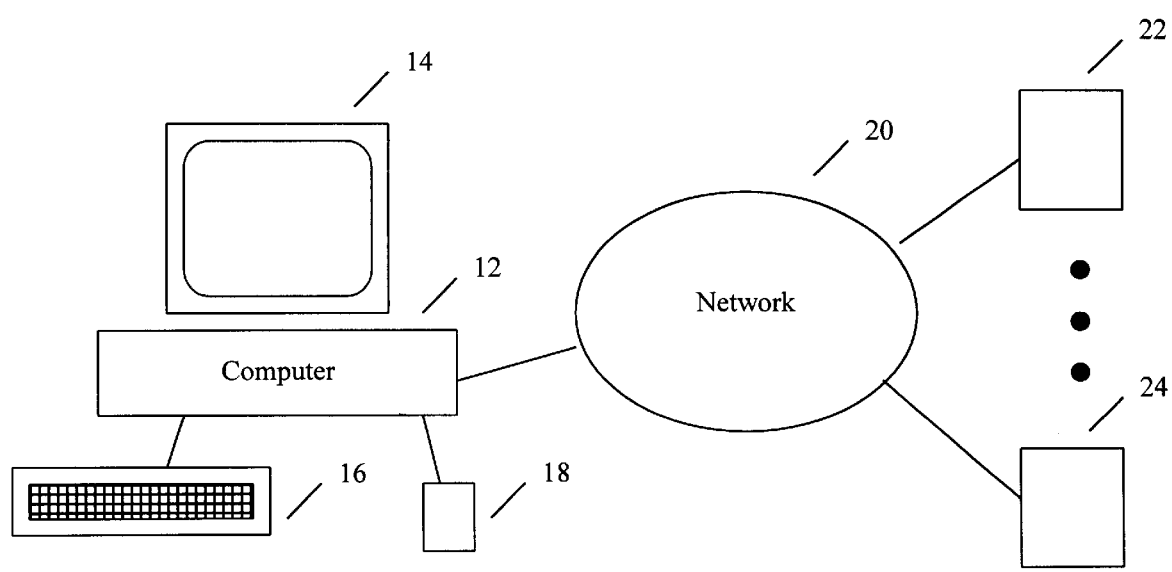
FIG. 1 illustrates typical hardware components of a system used by the present invention.

The present invention is designed to operate in an environment in which a user of an electronic mail (e-mail) system has access to a typical computer system 10, as depicted in FIG. 1, such as a desktop computer system including a computer 12 which executes an e-mail client application, a display 14 on which e-mail messages are viewed in application windows, a keyboard 16 used to compose e-mail messages and an input device 18, such as a mouse, used to activate controls (buttons) in the e-mail system. The computer 12 includes a modem or network interface that allows the computer to connect to a transmission network 20, such as a corporate or enterprise network, the Internet or any other computer or communications network, allowing the user to send messages to and receive messages from other computers 22 and 24 (or other network communication devices) connected to the network. The computer also includes storage, such as RAM, ROM, magnetic disk, optical disk, etc., suitable for storing and distribution of the processes and displays described herein. The invention can also be distributed via downloading over a network or otherwise.

Figure 2:
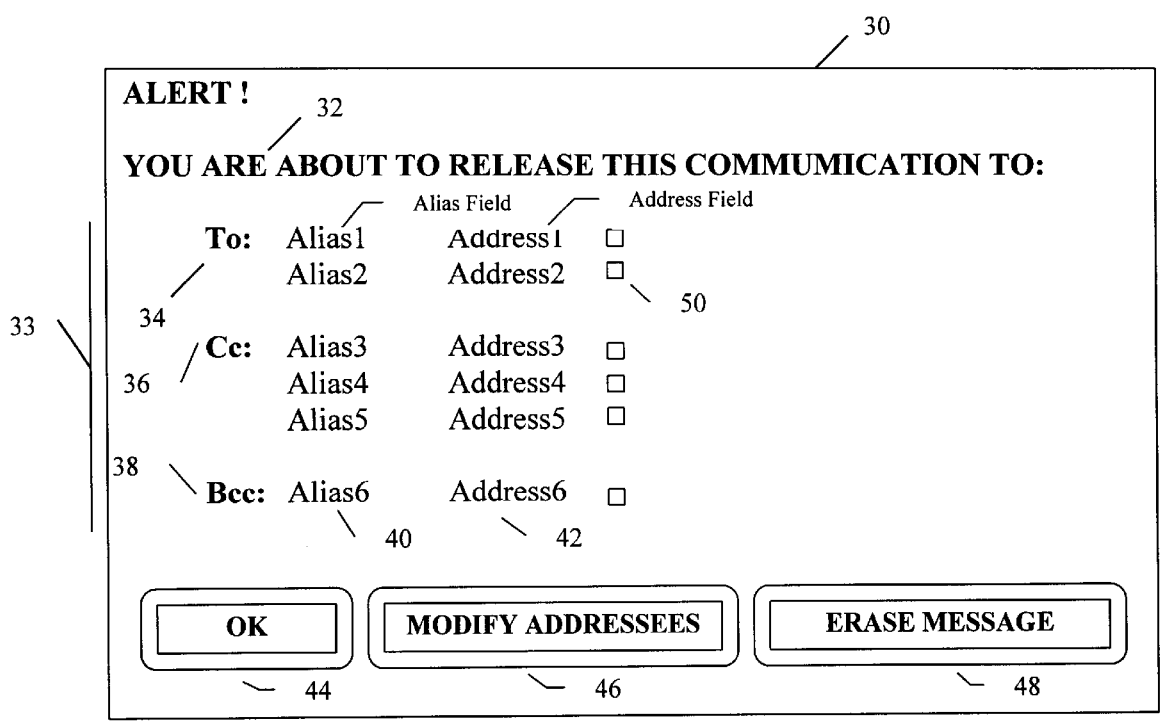
FIG. 2 depicts a dialog box according to the present invention.

When a user has composed a message and requested that the message be sent (for example, by activating a send control—button—on the e-mail application's graphical user interface (GUI) displayed on the display 14 by the e-mail program executing in the computer 12), or an unauthorized message is about to be sent, the present invention alerts the user by popping-up or displaying a dialog box 30, such as depicted in FIG. 2, or activating another type of alert such as an icon, sound, verbal cue, etc. The alert need not be limited to the type shown in FIG. 2, which is offered an example only. The dialog box 30 includes text 32 which indicates to the user that the user is about to send a message to the listed individuals.

The dialog box 30 can provide a simple list of the message recipients or addressees using the network addresses. More preferably, the dialog box 30 provides a list 33 of the recipients divided according to their addressee status in sections "To"—34, "cc"—36, and "bcc"—38, etc. Each of the entries in the list 33 preferably includes an alias field 40 in which the user's alias name of the recipient is provided, if available. An alias is the name that the user includes in the user's address book for a particular addressee. A resolved address field 42 is also preferably provided. A fully resolved address is an address on which the mail server can base message delivery (i.e., no further translation is required by the client application).

The dialog box 30 also includes an "OK" control or button 44 that allows the user to approve or send the message to the recipients on the list. When this control 44 is activated, the message is sent immediately or placed in a send queue (or out-box) to be sent in accordance with the application's preset configuration. A "Modify Addressees" control 46 is also provided that allows the user to modify the recipients of the message. Activating this control 46 allows the user to edit the list 33 removing any unintended recipients. The recipients removed from the message list 33 are removed from the message header. An "Erase" control 48 is also provided that causes the message to be deleted. Another control (not shown) can be provided that allows the user to modify the text of the message. Activating this text modification control would return the message to the e-mail system at the compose stage and allow the user to remove any text before the message is sent.

The dialog box 30 can optionally include a confirmation box or field 50 corresponding to each entry on the list 33. The confirmation box is marked by the user to confirm that the particular recipient is intended. When the send control 44 is activated, within this option, the system checks to see if all of the confirmation boxes 50 have been checked, provides an overlay dialog box that all confirmation boxes must be marked before the message is sent if all have not been marked and will not send the message until all the confirmation boxes are marked. Alternatively, it will generate a new list without those names marked and the dialog box 30 with the alert will appear again. The invention is not limited to these scenarios. They are offered as examples of how the addressee list can be confirmed.

A typical Internet text e-mail message, as depicted in FIG. 3, is comprised of header fields 62 and a body 64. The header fields 62 are separated from the message body by a null (blank) line. Each header field is comprised of a field name (e.g., To, From, Cc, etc.) and a field body (e.g., mailbox address.) Field names and field bodies are separated by a colon (":"). A field body is terminated by a carriage return/line feed. Lines used to continue header fields 62 begin with a space or tab. Addresses in field bodies are separated by commas (","). Some header field bodies are interpreted or parsed simply as free text, for example, the field body of a "Subject:" field.

Figure 4:
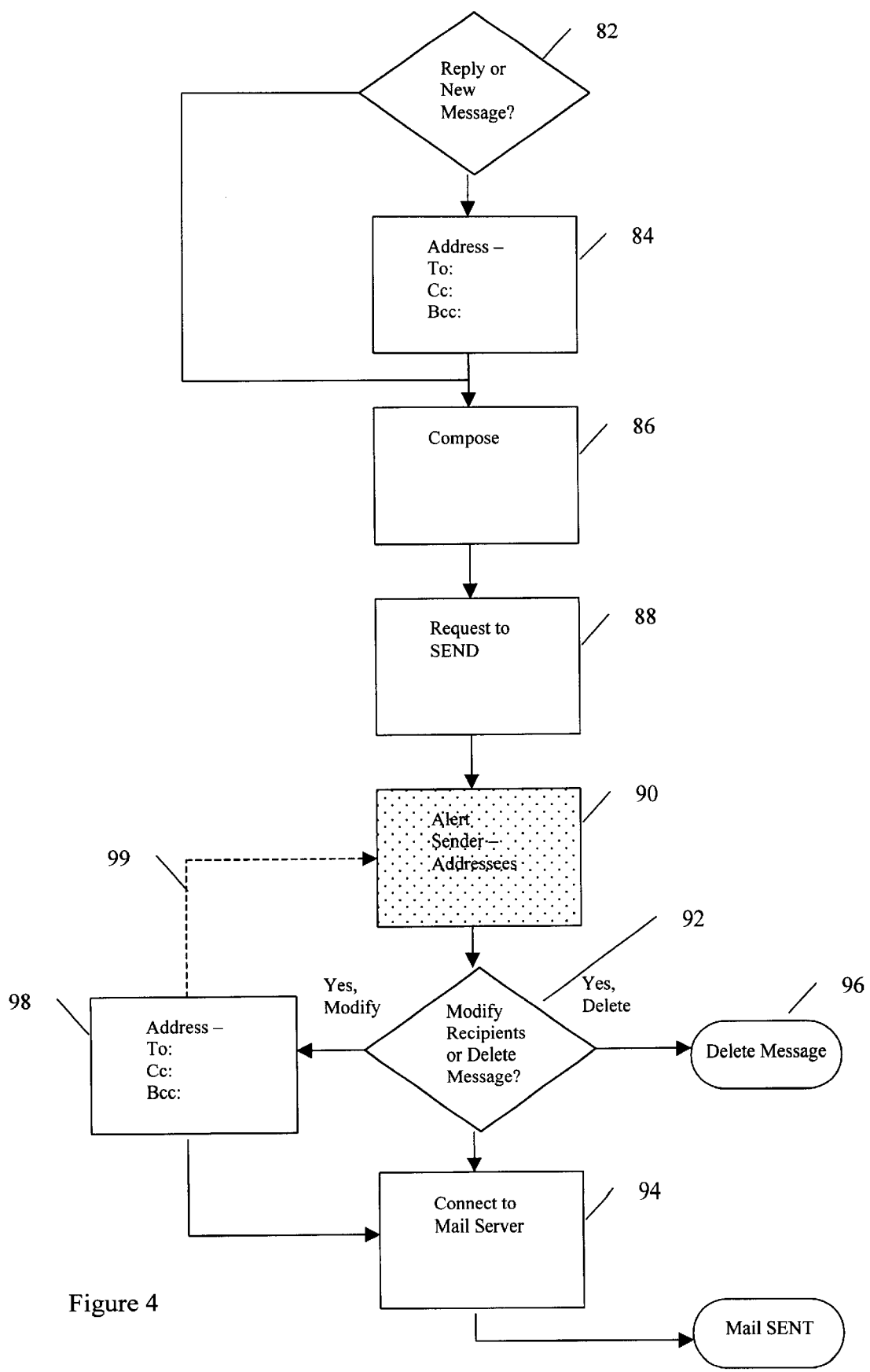
FIG. 4 depicts the process of the present invention.

The process of the present invention is inserted into a conventional e-mail process. The system when alerting the user to recipients of messages created by the user, as depicted in FIG. 4, first determines 82 whether the message is a reply or a new message. If the message is a new message, the user provides recipient addresses 84 for the message by entering new addresses, selecting addresses from an address book, copying addresses from other sources, etc. The user then composes 86 the message. The user can also add additional recipients to the message during the composition operation by returning to the address entry operation.

Figure 5:
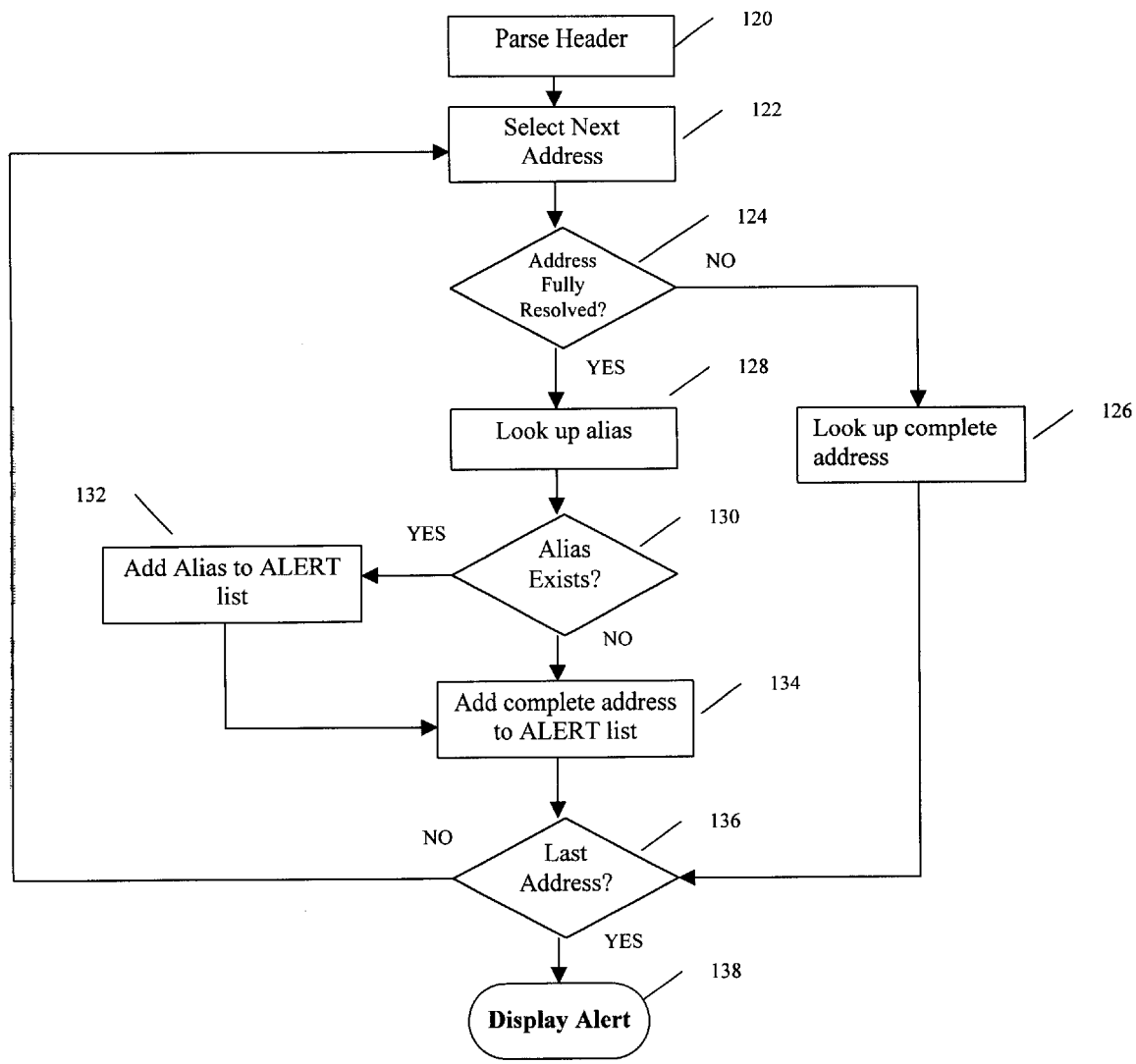
FIG. 5 illustrates the flow of the dialog box completion process.

When the message is finished, the user activates a send control (button) requesting 88 that the system send the message. Prior to sending the message (that is, prior to making a connection to the mail server application) the system, in accordance with the invention, recognizes that the message is to be sent and the system displays the dialog box 30 of FIG. 2, or similar alert, to alert 90 the user that a message is about to be sent and to indicate to the user the addressees of the message. The operations in the alert 90 associated with completing the fields 40 and 42 of the list 33 will be discussed in more detail with respect to FIG. 5. The system then awaits 92 a selection of one of the controls 44, 46 or 48. If the "OK" control 44 is selected, the message is queued to be sent or sent 94, however configured by the user. If the Erase control 48 is selected, the message is deleted 96. If the "Modify Addressees" control 46 is activated, the system allows the user to modify 98 the list of recipients which operation is discussed in more detail in FIG. 6. Once the modify operation is completed, the message is sent 94. Alternatively, as depicted by the dashed line 99, the system can return to the operation 90 of presenting the alert dialog box and not send the message until the send control 44 is activated.

When creating the entries of the list 33, the system parses 120 (see FIG. 5) the header to identify each of the addresses of the recipients. An address is then selected 122, such as the first or last address in the header. The system determines 124 whether the selected address requires local resolution. An example is a local (i.e., this client) alias. In this case, the system retrieves 126 from the user's electronic address book, the address sufficient for the mail server(s) to make delivery. A typical address book has a structure such as set forth Table 1 below where locally resolved addresses (e.g., aliases and groups or lists) and fully resolved addresses are shown.

TABLE 1 alias "Smith Jim" smith.jim@companyx.com
alias "Eddie" ejones@companyy.com
alias team Eddie, lisa@bbb.com If the address is fully resolved (i.e., not further resolvable by the local system), the system searches 128 for the alias for the fully qualified address in the user's address book. If the alias exists 130, the alias is added 132 to the alert list of the dialog box 30, in addition to the fully resolved address. The system then checks 136 to see if additional addresses remain in the header that have not been processed. If not, the alert dialog box 30, including the alert message 32, is produced and displayed 138 using conventional dialog box production techniques.

Figure 6:
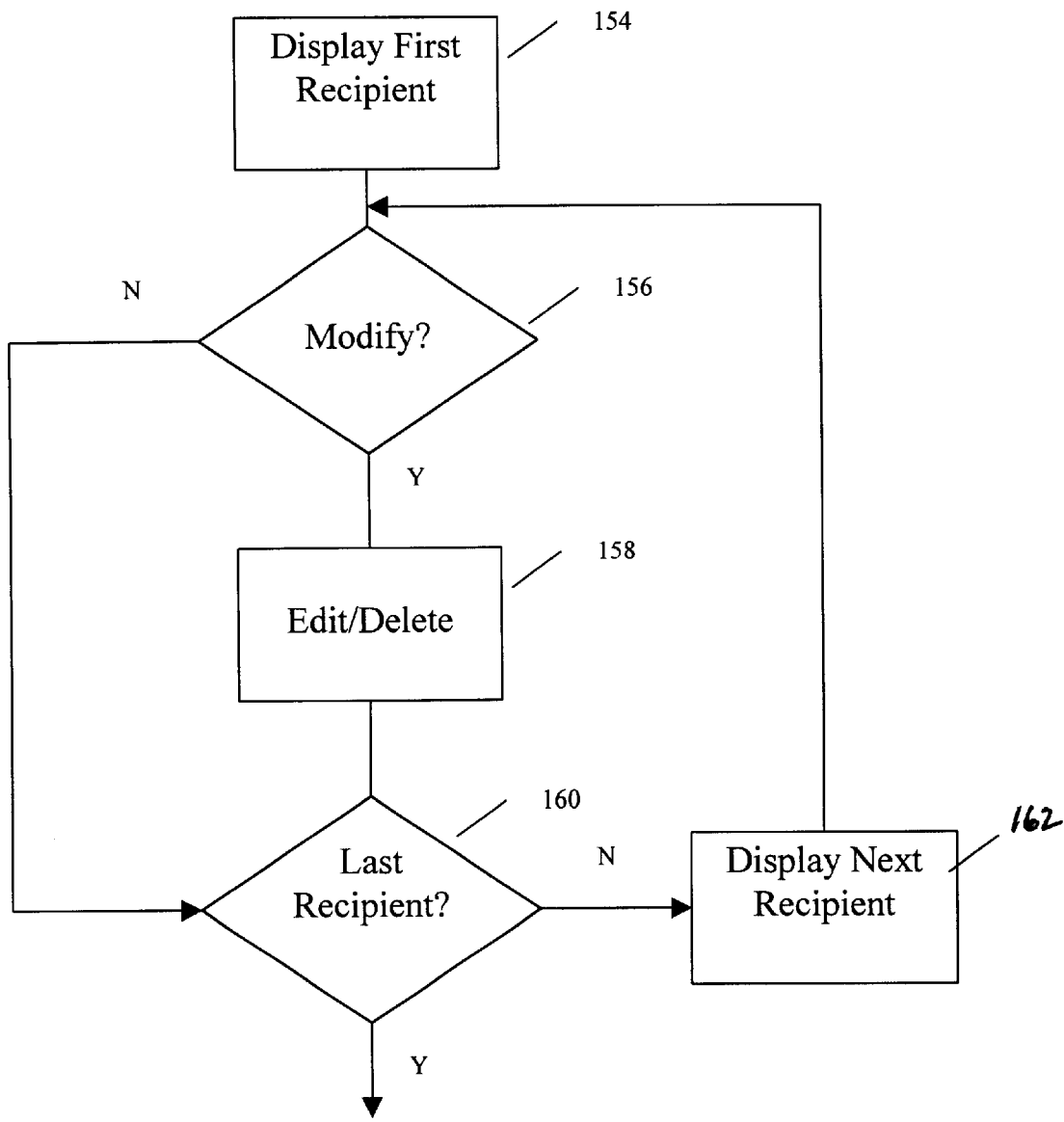
FIG. 6 shows a modify process.

The modify operation 98, as depicted in FIG. 6, begins with the first intended recipient from the message file or buffer being displayed 154. The user is then given the option 156 to modify this addressee. If modification is selected, the user edits or deletes 158 the addressee. When the addressee is deleted, the system removes any delimiters from the header field (such as the comma between addressees in a list) that need to be removed. The list is then examined to determine 160 whether any additional addressees exist and the next is displayed 162 and, if so, the system returns to the modify decision 156.

Electronic mail systems generally come in a number of types. One type are those that are on-line with the mail server such that when messages are sent, the client essentially immediately connects to the mail server and the message is transferred. Another type include those off-line systems that do not immediately send the messages but place them in a queue or out-box to be sent at a later time when a connection to a mail server is possible or specified, such as when an e-mail application is closed. Other types of systems are possible. The particular implementation of the e-mail system with respect to the present invention is not critical as long as an alert, such as the dialog box 30, is presented to the user before the e-mail is sent so the user will have an opportunity to modify the addressees of the e-mail message.

The present invention has been described with respect to providing a modify control that places the system in a state where the user can modify the list of recipients. Alternatively, the user can select a list entry with the pointing device 18, activating a dialog box that will allow modification that includes a delete selection, similar to the way files can be deleted using conventional windows-based operating systems. The system can track messages that have been authorized to be sent by associating an authorization flag with each message or a list of authorized messages.

The present invention has been described with respect to presenting a simple dialog box with an addressee list, however, an audible alert can also be produced, the dialog box can be flashed or an alert color, such as red, can be used. As another alternative, the audible alert can be accompanied by a dialog box that presents the user with the option of reviewing the addressee list or sending the message without reviewing the list. Or, the alert can be an audible or visual warning alone. The invention also applies to messaging systems such as handheld electronic messaging systems, dedicated mail devices and pagers. The invention has been described with controls that allow the user to modify, delete and OK a message after an alert. It is also possible to provide a control that places the message in a queue for later sending after a cooling off period, as specified by the user, has occurred.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An e-mail method, comprising:
   recognizing whether a complete electronic mail message having a valid recipient address for an unintended recipient, is to be sent, after a send function has been initiated, from a sending side to a receiving side; and
   alerting a system user on the sending side as to the message being sent.

2. A method as recited in claim 1, wherein the message is not sent until approved by the system user.

3. A method as recited in claim 1, wherein the alerting alerts the user as to addressees of the message.

4. A method as recited in claim 1, wherein the alerting alerts the user as to an addressee of the message.

5. A method as recited in claim 1, wherein said recognizing recognizes a send operation initiated by the user.

6. A method as recited in claim 1, wherein said recognizing recognizes a send operation initiated by an unauthorized agent.

7. A method as recited in claim 1, further comprising:
   allowing the user to approve sending of the message after the alert; and
   sending the message to an addressee.

8. A method as recited in claim 1, wherein said alerting comprises providing a display of both alias names and fully resolved addresses.

9. A method as recited in claim 8, wherein the display includes a confirmation field.

10. A method as recited in claim 1, further comprising allowing the user to modify an addressee list after the alerting.

11. A method as recited in claim 10, wherein the alerting is performed after the addressee list is modified.

12. An electronic mail method, comprising:
   allowing a user on a sending side to indicate that a complete message having a valid recipient address for an unintended recipient, is to be sent, after a send function has been initiated, from the sending side to a receiving side; and
   alerting the user on the sending side that the message is to be sent.

13. An electronic mail method, comprising:
   recognizing that a complete message having a valid recipient address for an unintended recipient, is to be sent, after a send function has been initiated, by an unauthorized agent from a sending side to a receiving side; and
   alerting a user on the sending side that the message is to be sent.

14. An e-mail method, comprising:
   recognizing whether a complete electronic mail message having a valid recipient for an unintended recipient, is to be sent, after a send function has been initiated, by a user or an unauthorized agent from a sending side to a receiving side;
   alerting the user on the sending side as to the message being sent and as to addressees of the message by providing a display of both alias names and fully resolved addresses when available and a confirmation field for each address;

allowing the user to approve sending of the message to an addressee after the alert by marking the confirmation field;

allowing the user to modify an addressee list after the alert;

allowing the user to erase the message; and sending the message after all addressees have been approved.

15. An apparatus, comprising:

an e-mail transmission system having a sending side and a receiving side; and an e-mail system recognizing a complete e-mail message having a valid recipient address for an unintended recipient, is to be sent, after a send function has been initiated, by a user via the transmission system and alerting a user on the sending side as to the addressees of the message.

16. A computer readable storage medium for controlling a computer including a computer program recognizing whether a complete electronic mail message having a valid recipient address for an unintended recipient, is to be sent, after a send function has been initiated, and alerting a user as to the message being sent.

17. An electronic message alert display, comprising:

text alerting a user on a sending side as to a complete electronic message having a valid recipient address for an unintended recipient, about to be sent, after a send function has been initiated, and a list of addressees.

18. A display as recited in claim 17, wherein the list shows an addressee alias and a fully resolved address.

19. A display, as recited in claim 17, further comprising a modify addressee control.

20. A display as recited in claim 17, further comprising an erase control.

21. A display as recited in claim 17, further comprising a confirmation to send field.

22. An electronic mail method, comprising:

determining whether a complete electronic mail message having a valid recipient address that satisfies requirements for transmission, is to be sent, after a send function has been initiated, by detecting, on a sending side, a send operation initiated by a user and detecting a send operation initiated by an unauthorized agent;

alerting an e-mail system user on the sending side as to addressees of the message by providing a display of both available alias names and fully resolved addresses and a confirmation field for each intended recipient;

allowing the user to modify an addressee list after the alert with the alert being again produced after the intended recipient list is modified;

allowing the user to approve sending of the message after the alert; and sending the message after approval.

23. A method for alerting a user on a sending side as to the addressees of an e-mail before sending, said method comprising:

composing a complete e-mail message;

addressing the e-mail message;

requesting that the e-mail message having a valid recipient address that satisfies requirements for transmission, be sent, after a send function has been initiated, alerting the sender on the sending side that the e-mail is about to be sent and listing the addressees;

modifying, deleting or confirming the addressees; and sending or deleting the message, if sending, connecting to a mail server.

24. A method according to claim 23, wherein in said alerting, modifying, deleting or confirming addressees, the e-mail system performs:

parsing the address header;

selecting an address;

determining whether the address is fully resolved;

determining if an alias exists;

resolving group or list names;

adding aliases and/or fully resolved addresses to the alert list; and alerting, again, the sender that the e-mail is about to be sent and listing the addressees.

25. An e-mail method, comprising:

determining that a complete validly addressed electronic mail message for an unintended recipient, is to be sent from a sending side to a receiving side, after a send function has been activated; and alerting a system user on the sending side as to the message being sent.

* * * * *